June 25, 1935.   S. C. CARNEY   2,005,932
FRACTIONATING PROCESS AND APPARATUS
Filed May 25, 1931

Inventor   SAMUEL C. CARNEY.
By His Attorney

Patented June 25, 1935

2,005,932

UNITED STATES PATENT OFFICE 2,005,932

FRACTIONATING PROCESS AND APPARATUS

Samuel C. Carney, Berkeley, Calif., assignor to Shell Development Company, San Francisco, Calif., a corporation of Delaware Application May 25, 1931, Serial No. 539,718

15 Claims. (Cl. 202—40)

This invention relates to the construction and operation of devices such as fractionating towers, rectifiers, etc. whose function is that of selectively separating composite vapors and liquids to obtain more or less pure fractions therefrom.

My invention consists more particularly in an improved rectifying column capable of more uniform and even operation than has heretofore been possible. The plate efficiency is increased, and a very close separation can be obtained. It is understood that the appended claims are to be accorded the range and scope of equivalents consistent with the state of the prior art.

As the art of fractionation is carried out, some form of column is usually employed. The elementary purpose of such a column is to make it easy for light material to move upward and difficult for it to move downward, and to make it easy for heavy material to move downward and difficult for it to move upward. These functions in connection with the well known bubble plate column which is generally considered to be the most efficient means for fractionation, are briefly as follows. Vapor or light material passing up is bubbled thru a layer of liquid reflux maintained on the plate above. On contact with the liquid the heavier parts of the vapor condense and an equivalent amount of the reflux is vaporized, the new vapors passing further upward. Vapors cannot pass down on account of the liquid seal maintained on every plate. Only liquid can pass down and consequently the reflux overflows to the plate below on being displaced by a flow from the plate above. The liquid cannot move upward except as parts of it may be vaporized.

Actually, however, certain difficulties are encountered which greatly detract from the efficiency of the column and prevent ideal operation. Many of these difficulties are caused by disturbances in the equilibrium of the column brought about by variations in the physical operating conditions, such for instance as the usual variations in temperature and pressure. The composition of the liquid on any plate varies with the temperature and pressure at that plate. When due to slight variations within the column heavier material than was already on a certain plate rises and is condensed on that plate, the vapor pressure of the new liquid mixture will be reduced, and there will be increased boiling and further flow of vapor from below to the zone of lower pressure. This will bring heavier material up the column with the result that the equilibrium of the column is upset and the overhead product will be contaminated by heavier fractions. To correct this the operator must either reduce the heat supplied to the bottom of the column or decrease the rate of withdrawing overhead product. The desired equilibrium may then be slowly recovered under careful control of the operator. The operating conditions are always varying however, and the present state of the art consists in attempting to maintain an unstable equilibrium within the limits allowable in producing an overhead product of the degree of purity desired. The success of these attempts and the value of the product is directly dependent on the skill of the operator.

In the present bubble column any heavier fractions that have, due to operating variations, reached a level higher than the one at more normal conditions corresponding to their composition, are only very slowly returned to the lower level. The heavier material is dissolved in the lighter liquid and can only be completely removed from the plate by draining all of the liquid therefrom. This of course is impossible in the column and it is actually only removed on account of its dilution by the liquid reflux from the plate above and overflow to the plate below, each increment of overflow carrying its portion of the heavier fraction. Theoretically the heavier material can never be completely removed altho dilution be infinite, but it is slowly removed for all practical purposes after dilution by considerable reflux. This condition has the tendency to make the column sluggish in responding to external control, either automatic or manual.

The relatively large body of liquid maintained on each plate of the conventional bubble type, while essential to the operation of that type of plate, has certain inherent disadvantages. It amounts to the storage on the plate of a substantial amount of sensible heat which in case of a reduction in pressure results in an increased amount of vapor being formed. The vapor velocity in the column is consequently increased, and the vapor is of relatively higher molecular weight and more easily condensed thus tending to induce flooding of the column or condenser. The necessary reflux ratio has practical and theoretical reasons controlling its amount which are independent of the amount of reflux stored on each plate. The liquid phase can be reduced to the smallest practical amount because the phase rule holds true as long as any liquid remains on the plate. The amount of liquid maintained on each plate also affects the ease with which heavier material is returned to its own level in the column, as mentioned above. Obviously the less the volume of liquid on a plate the more easily and quickly heavier material can be removed by dilution by the flow of reflux from the plate above.

These objectionable characteristics are inherent in all conventional bubble plate columns, and it is quite evident therefore that any process which facilitates the rise of light material and the fall of heavy, is a very valuable contribution to the art.

I have discovered that by protecting the two phases, liquid and vapor, in the column, these objectionable conditions can be practically eliminated. I accomplish this by preventing physical contact between the vapors and the liquid until after they have passed over a relatively large heat exchanging area consisting of a heat conducting wall separating the two phases. After the heat exchange the vapor is allowed a physical contact with the liquid, after which the vapor passes upward and the liquid reflux flows directly to the plate below. My invention also involves such construction as will reduce the amount of liquid carried on each plate to a practical minimum.

The drawing by way of illustration shows a preferred example of an apparatus suitable for carrying out my invention. However, it will be understood that numerous other modifications and adaptions are possible and that my invention is not limited to any specific construction.

Figure 1:
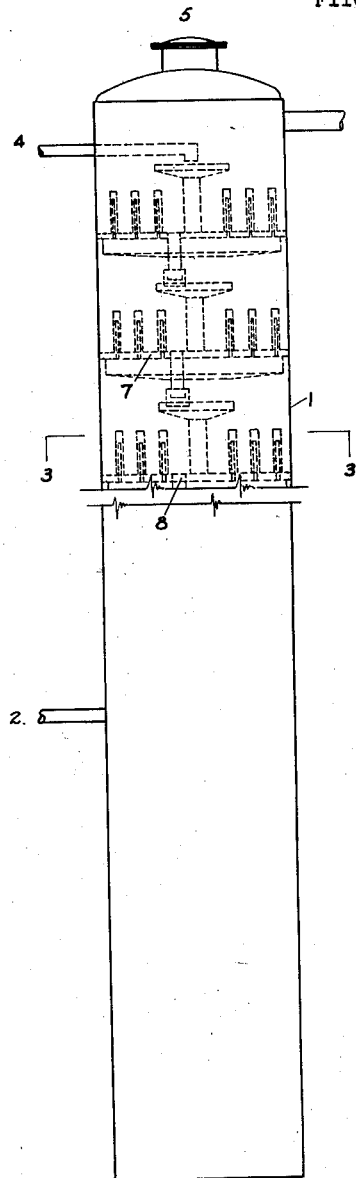
Fig. 1 shows an elevational view of a fractionating column embodying my invention. The top dotted portion shows the arrangement of the bubble plates which extend thruout the column.
Figure 3:
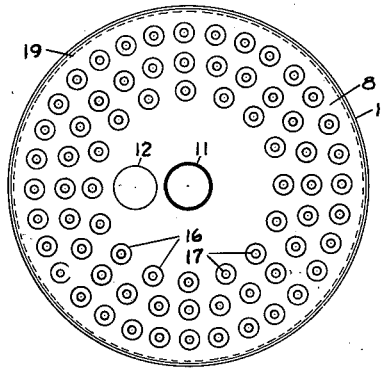
Fig. 3 represents an enlarged sectional plan view taken on the line 3—3 of Fig. 1.

Referring to the drawing, the column diagrammatically illustrated consists of a vertical shell or container 1, a feed inlet pipe 2, a vapor exit pipe 3, a reflux return pipe 4, a removable inspection dome 5, and a liquid draw-off pipe 6. The column is equipped with a series of identical fractionating plates 7 and 8, shown in detail in Figs. 2 and 3. Each plate consists of the two tube sheets 9 and 10 separated from each other so as to form the restricted space A between them, and sealed around their circumferences by the ring 19. Sheet 9 is connected to the down coming pipe 11, opening into space A. Sheet 9 is drilled for and has sealed in it the vertical tubes 16 open at both ends. It is also fitted with the drain pipe 12 passing thru space A and sheet 10 into the liquid seal 14 below the plate. Plate 10 is drilled with a series of holes concentric with and smaller than those in sheet 9. Into these holes are sealed the tubes 17 of smaller diameter and passing concentrically up into tubes 16. Tubes 17 are also open at both ends, the top ends being slightly lower than the tops of 16. The down coming pipes 11 are taller and of greater diameter than the tubes 16, and have at their top the funnel shaped members 15. Attached to the underside of plates 10 near the rings 19 are the deflector pans 13, so placed that any liquid falling from the plates will be caught by the funnels 15. The tubes 16 may, if desired, be supplied with any sort of cap 18 which will assist in removing any liquid particles that may be entrained in the vapor. The base of the column is supplied with any desired type of heating element.

In operation the feed is supplied to the column thru the line 2, and passes thru the series of plates, the lightest fractions being removed thru line 3. Reflux condensate is supplied to the column thru the connection 4 and bottom product is removed by the draw-off pipe 6.

Figure 2:
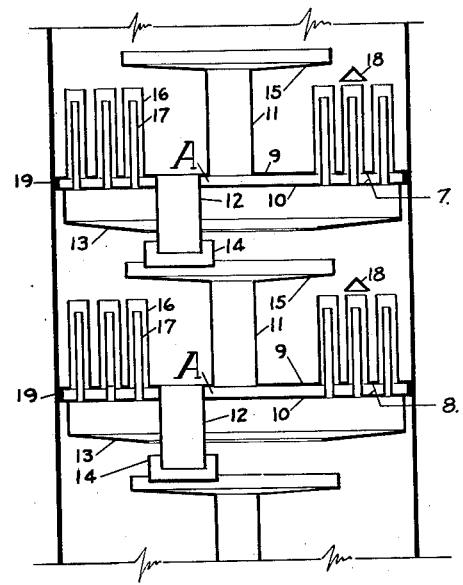
Fig. 2 represents an enlarged sectional elevation of the column shown in Fig. 1, broken away for the sake of simplicity, to show any two consecutive fractionating trays.

Vapor rising from any plate, such as tray 8, Fig. 2, passes upward thru the rather tortuous path around the funnel 15 and deflector 13, along the bottom of sheet 10 and into the tubes 17 of plate 7. Liquid reflux from the plate above 7 is caught in the funnel 15 of plate 7, flows down thru pipe 11 into space A and then rises in the annular space between the tubes 16 and 17. On reaching the top of tubes 17 most of the reflux enters them and flows down around their inside walls countercurrent to the rising vapor. Any fractions of the vapor substantially heavier than the liquid will be condensed and flow directly back to funnel 15 of plate 8 with the reflux. The lighter uncondensed vapors proceed up the tubes 17 and on leaving them are subjected to an intimate contact with the liquid as they bubble thru it and out of the top of tubes 16. The vapor from plate 7 then passes directly to the next plate above. The heat liberated by the condensation of heavier vapor in the tubes 17 is absorbed thru the tube walls by the liquid reflux as it rises in the annular space between the tubes 16 and 17 and a portion of the reflux is vaporized equivalent to the condensation. After contact of the two phases at the top of tubes 17, any unvaporized liquid that does not flow down the inside of tubes 17 is carried over the top of tubes 16 and down to the top of sheet 9, from which it immediately drains to plate 8 thru the down pipe 12 of plate 7. As no liquid is maintained on sheet 9 there can be no stagnant pools of reflux.

By the time that contact of the two phases occurs at the top of tubes 17, the lightest fractions of the liquid have been vaporized and the heaviest fractions of the vapor condensed, and the two phases have thus from different directions approached the same composition, hence the usual tendency of any heavier material from a lower level to mix with the lighter reflux and lower the vapor pressure of the reflux is reduced. By my invention it is more difficult for any material to be brought up in a column and rise to a level where the composition of the reflux is substantially lighter than its own. In other words, the difficulty with which heavy material can rise is at a maximum while lighter material can rise with maximum ease. The heat of heavier vapors is utilized in vaporizing lighter material, while the tendency of the former to lower the vapor pressure of the lighter liquid is reduced by delaying physical mixture between the two. Any low pressure zone in the column will be immediately brought back to normal by the additional heat supplied to the low pressure tray due to the increased rise and condensation of heavier material from below; the additional heat supplied vaporizing more reflux from the tray thereby raising the pressure. In this manner my invention provides a more stably operating column which is not subject to the great variations and rapidly changing conditions encountered in the usual bubble tower. It is consequently much easier to control and a greater thru-put can be maintained with safety.

During operation there is a constant liquid flow down pipes 11, thru space A and up the annular space between the tubes 16 and 17. Any heavier material discharged into the funnel 15 will move with the flow and will be removed to the plate below by the time an amount of reflux has passed thru the pipe 11, the space A, and the annular space between the tubes, equal to their total volume. Thus the ease with which heavier material can flow downward is increased as its removal does not rest on an infinite amount of dilution as is the case with the ordinary bubble plate. The down pipe 11, the space A, and the annular space between the tubes can be considered as a sort of manometer, permitting the physical contact of liquid and vapor only at the multiple overflow ends of the manometer; and not as in the case in the conventional plate, at numerous points between the entrance of reflux to the plate and the overflow from it. The ideal of uniformity in both distribution and composition of the reflux over the entire plate area is much more nearly realized. As the reflux passing from one plate to a lower one is more nearly of the composition of the liquid on the lower plate due to condensation and addition to it of heavier fractions of the vapor, the equilibrium of the lower liquid is not disturbed and my improved column operates free from those local disturbances, usually known in the art as surges.

By way of presenting an example the following specifications are given of a column of 4 inches in diameter that I have operated very successfully. The plates had 40 tubes of ¼ inch and 40 of ⅜ inch outside diameter and the heat exchanging surface of the tubes was 188 square inches. The cross sectional area of the tubes was 2 square inches while that of the column was 12.

My process does not contemplate the transfer thru the heat exchanging surface of each plate of the large amount of heat necessary in principle to successful rectification. It depends rather on the transfer of part of that necessary total, which part will be sufficient to maintain a vapor pressure of the liquid on any plate which will tend to rise when the vapor from below becomes heavier instead of falling as is the case with conventional plates. The effect produced is largely a qualitative one, brought about by the addition of a small amount of heat to the small body of liquid in contact with the surface, as above described. This will generate a small volume of vapor, but one large enough to influence the pressure in the vapor space between that plate and the one next higher. It will also sufficiently modify the composition of such liquid as to permit its temperature to rise. This temperature rise of the liquid with corresponding decline in that of the vapor will reduce and in the limiting case stop entirely heat transfer. The limiting case, of course, is that where the composition of liquid on any plate is the same as that of vapor coming to that plate from below and there could then be no heat transfer at all. Thus the heat flow is self-compensating. If no temperature difference exists there is no need to transfer heat and none can be transferred, and the greater the temperature difference across the surface, the greater is the desirability of heat transfer and the more transferred. The coefficient of heat transfer between a condensing vapor and a boiling liquid is the greatest known to the art.

My invention is in no way limited to the figures given in the above example as an infinite number of dimensional combinations and specifications are possible. In general the size and number of tubes 17 should be chosen so as to obtain the desired heat exchanging surface, while not restricting the flow of vapors sufficiently to produce any material pressure gradient between the plates.

In the embodiment of my invention illustrated in the drawing, the heat exchanging elements 16 and 17 have been shown as tubes. However, any heat exchanging surfaces that separate and prevent actual contact between the phases may be employed. A system of rectangular ducts, for instance, would be more efficient than tubes as their surface or heat exchanging area would be greater in relation to cross sectional area.

My invention presents a great advance in the art of fractionation and rectification. It is adaptable to any commercial application of such processes for obtaining separations of any possible substance in the degree desired, allowing an increased thru put and uniformity of operation and product.

I claim as my invention:

1. An apparatus for rectifying liquids comprising: a column, a series of hollow plates therein, means for passing a directed flow of liquid out of the plates, means for passing rising vapor thru the plates separated from the flow of liquid by a relatively large heat exchanging surface, and means for passing liquid to the next lower plate in contact with and countercurrent to the rising vapor.

2. An apparatus for rectifying liquids comprising: a column, a series of hollow plates therein, means for passing a directed flow of liquid out of the plates, means for passing rising vapor thru the plates concurrent to the flow of liquid but separated from the liquid by a relatively large heat exchanging surface, and means for passing liquid to the next lower plate in contact with and countercurrent to the rising vapor.

3. An apparatus for rectifying liquids comprising: a column, a series of hollow plates therein, means for passing liquid from each plate into the next lower plate, a plurality of tubes opening into the plates and extending to a height substantially above them, a like number of tubes of smaller diameter concentrically spaced within the larger tubes extending from a point below the tops of the larger tubes thru the plates and opening into the spaces below the plates.

4. A fractionating tray comprising: two parallel plates spaced from each other and joined around their edges forming an enclosed chamber, a plurality of tubes opening into the chamber and extending above it, an equal number of tubes of smaller diameter concentrically spaced within the chamber connected tubes extending thru the chamber and fitted into corresponding perforations in the lower plate, a relatively larger tube extending thru both plates from a height equal to that of the top plate to a distance below the bottom plate and fitted at its lower end with a liquid seal, a down coming pipe extending from above the top plate and opening into the chamber, and a funnel shaped member fitted at the top extremity of the down coming pipe.

5. In a process of rectification of liquids, wherein continuous streams of vapor and condensate are passing through a series of zones of gradually changing temperature, steps comprising: directing the stream of condensate in a zone into a confined space out of contact with vapor in the same zone, passing the condensate in a flow concurrent to the flow of vapor rising through the zone and in indirect heat exchange relationship therewith, whereby a portion of the condensate is evaporated and a portion of the vapor is condensed, then reversing the flow of condensate and bringing it in a countercurrent flow to and direct contact with the said flow of rising vapor, and passing the resulting total condensate to the next zone below.

6. In a process of rectification of liquids, wherein continuous streams of vapor and condensate are passing through a series of zones of gradually changing temperature, steps comprising: directing the stream of condensate in a zone into a confined space out of contact with vapor in the same zone, passing the condensate in a plurality of relatively long and thin confined streams concurrent to streams of vapor rising through the zone and in indirect heat exchange relationship therewith, whereby a portion of the condensate is evaporated and a portion of the vapor is condensed, then bringing the heated condensate into a direct contact with the vapor and passing the resulting total condensate to the next zone below.

7. In a process of rectification of liquids, wherein continuous streams of vapor and condensate are passing through a series of zones of gradually changing temperature, steps comprising: directing the stream of condensate in a zone into a confined space out of contact with vapor in the same zone, passing the condensate in a plurality of relatively long and thin confined streams concurrent to streams of vapor rising through the zone and in indirect heat exchange relationship therewith, whereby a portion of the condensate is evaporated and a portion of the vapor is condensed, then reversing the flow of liquid streams and bringing the condensate in a countercurrent flow to and direct contact with said streams of vapor, and passing the resulting total condensate to the next zone below.

8. A process of fractionation of liquids by means of a column having a series of plates, comprising: inducing a flow of liquid on each plate from its point or points of entrance to that plate to its numerous points of overflow to the plate below, by maintaining at its point or points of entrance a vertical head of liquid which is not subjected to heating by indirect transfer from the vapor rising from the next lower plate, and which unheated vertical head of liquid has hydraulic connection with numerous other vertical heads of liquid leading to the points of overflow, boiling the latter columns of liquid by indirect transfer of heat from vapor rising from below so that the head of boiling liquid does not balance hydraulically an equal head of the same liquid not boiling, thus inducing a flow of liquid to the various points of overflow proportional to the amount of heat being received at that portion of the plate area from the vapor arising to that plate.

9. A process of fractionation of liquids by means of a column having a series of plates, comprising: inducing a uniform distribution of the flow of vapor from such a lower plate with respect to the cross sectional area of the upper plate to which it is coming, by causing excess heat from any locally disproportionate flow of vapor to produce increased boiling of the liquid on the opposite side of the extended metallic surface of that portion of the upper plate, thus reducing the hydraulic head of liquid at that point and causing the flow thereto of an increased amount of liquid which by overflowing downward through the ducts through which the vapor is rising will reduce the cross sectional area available for the rising flow of vapor thereby effecting that an unequal distribution of vapor will furnish its own corrective.

10. The apparatus for rectifying liquids comprising a rectifying plate, means on the plate for passing the liquid to be rectified to a plurality of points distributed on the plate, and concentric vapor and liquid risers at said points for passing vapors through the plate and for directing the liquid in an effective indirect heat exchange relationship with said vapors.

11. In a process of fractionation of liquids by means of a column having a series of plates, steps comprising: boiling such continuously flowing supply of liquid by directing its flow over an extended metallic surface of suitable construction, while against the other side of such metallic surface is directed the flow of vapor arising from the next lower plate but without any direct contact between such liquid and vapor while such liquid is supported against the action of the force of gravity by any part of such metallic surface, and then allowing the boiling liquid to overflow, contacting the overflowing liquid with vapor rising from the next lower plate by causing the liquid to flow downward through a plurality of tubes of suitable cross-section and of a diameter very small relative to that of the shell of the column, while at the same time causing vapor from the next lower plate to flow upward through the same tubes.

12. In a process of rectification of liquids wherein continuous streams of vapor and condensate are passing through a series of zones of gradually changing temperature the steps comprising: directing the stream of condensate in a zone into a confined space and out of contact with vapor in the same zone, continuously advancing the condensate upwardly into indirect heat exchange relationship with vapor passing upwardly through the zone, then bringing the heated condensate into direct contact with the vapor and passing the condensate to the next zone below.

13. In a process of rectification of liquids wherein continuous streams of vapor and condensate are passing through a series of zones of gradually changing temperature the steps comprising: directing the stream of condensate in a zone into a confined space out of contact with vapor in the same zone, passing the condensate in concurrent flow to the flow of rising vapor and in indirect heat exchange therewith, then bringing the heated condensate into direct contact with the vapor while maintaining the upward flow of vapor and passing the resulting total condensate to the next zone below.

14. In a process of rectification of liquids by means of a column having a series of plates the steps comprising: maintaining on a plate a continuous flow of liquid being rectified, maintaining the liquid out of contact with the vapors passing over the plate, causing the flowing liquid to boil and give off vapors solely by indirect heat exchange with the vapors rising through the plate and combining the vapors passing through the plate with the vapors given off by the boiling liquid on the plate while maintaining the upward flow of the vapors concurrent then countercurrent to the flow of liquid.

15. In a process of rectification of liquids by means of a column divided into a plurality of adjacent fractionating zones by hollow plates extending across the column, the steps of directing a stream of condensate in a zone into a confined space within the hollow plate and out of contact with the vapor in the hollow plate, passing the vapor from the next lower zone through the plate and in concurrent indirect heat exchange with the condensate flowing within the said plate, causing the condensate to boil, then bringing the boiling condensate into direct contact with the vapor and passing the condensate to the next zone below.

SAMUEL C. CARNEY.